US011734390B2

(12) United States Patent
Yin et al.

(10) Patent No.: US 11,734,390 B2
(45) Date of Patent: Aug. 22, 2023

(54) UNSUPERVISED DOMAIN ADAPTATION METHOD, DEVICE, SYSTEM AND STORAGE MEDIUM OF SEMANTIC SEGMENTATION BASED ON UNIFORM CLUSTERING

(71) Applicant: Zhejiang University, Hangzhou (CN)

(72) Inventors: Jianwei Yin, Hangzhou (CN); Ge Su, Hangzhou (CN); Yongheng Shang, Hangzhou (CN); Yingchun Yang, Hangzhou (CN); Shuiguang Deng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 101 days.

(21) Appl. No.: 17/408,441

(22) Filed: Aug. 22, 2021

(65) Prior Publication Data

US 2022/0383052 A1    Dec. 1, 2022

(30) Foreign Application Priority Data

May 18, 2021   (CN) .......................... 202110539925.3

(51) Int. Cl.
*G06N 3/02*       (2006.01)
*G06F 18/21*      (2023.01)
(Continued)

(52) U.S. Cl.
CPC ...... *G06F 18/2193* (2023.01); *G06F 18/2132* (2023.01); *G06F 18/2155* (2023.01);
(Continued)

(58) Field of Classification Search
CPC ............... G06F 18/23; G06F 18/24133; G06F 18/24137; G06F 18/232; G06F 16/55;
(Continued)

(56) References Cited

U.S. PATENT DOCUMENTS

| | | |
|---|---|---|
| 2021/0390355 A1* | 12/2021 | Xu .......................... G06N 3/08 |
| 2022/0148191 A1* | 5/2022 | Liu .......................... G06T 7/11 |

\* cited by examiner

*Primary Examiner* — Sumati Lefkowitz
*Assistant Examiner* — Michael Adam Shariff
(74) *Attorney, Agent, or Firm* — The Roy Gross Law Firm, LLC; Roy Gross (57) ABSTRACT

The present disclosure discloses an unsupervised domain adaptation method, a device, a system and a storage medium of semantic segmentation based on uniform clustering; first, a prototype-based source domain uniform clustering loss and an empirical prototype-based target domain uniform clustering loss are established, to reduce intra-class differences of pixels responding to the same category; meanwhile, the pixels with similar structures but different classes are driven away from each other, wherein they tend to be evenly distributed, increasing the inter-class distance and overcoming the problem that the category boundaries are unclear during the domain adaptation process; next, the prototype-based source domain uniform clustering loss and the empirical prototype-based target domain uniform clustering loss are integrated into an adversarial training framework, which reduces the domain difference between the source domain and the target domain, thus improving the accuracy of semantic segmentation.

16 Claims, 4 Drawing Sheets

(51) Int. Cl.
*G06N 3/088* (2023.01)
*G06F 18/232* (2023.01)
*G06F 18/2132* (2023.01)
*G06F 18/214* (2023.01)
*G06F 18/2413* (2023.01)

(52) U.S. Cl.
CPC ...... *G06F 18/232* (2023.01); *G06F 18/24133* (2023.01); *G06N 3/088* (2013.01)

(58) Field of Classification Search
CPC ........... G06F 18/2321; G06F 18/23213; G06F 18/2132; G06F 18/2325; G06F 18/2337; G06F 18/00; G06F 18/2193; G06F 18/214; G06F 18/2155; G06V 10/26; G06V 10/424; G06V 30/18171; G06V 20/70; G06V 10/267; G06V 10/763; G06V 10/7753; G06V 10/82; G06K 9/6218; G06K 9/6271; G06K 9/6234; G06K 9/622; G06K 9/6259; G06K 9/6265; G06N 3/094; G06N 3/088; G06N 3/02; G06N 3/044; G06N 3/0442; G06N 20/00; G06N 3/045; G06T 7/10; G06T 2207/20081; G06T 2207/20084
See application file for complete search history.

UNSUPERVISED DOMAIN ADAPTATION METHOD, DEVICE, SYSTEM AND STORAGE MEDIUM OF SEMANTIC SEGMENTATION BASED ON UNIFORM CLUSTERING

CROSS REFERENCE TO RELATED APPLICATION(S)

This patent application claims the benefit and priority of Chinese Patent Application No. 202110539925.3, filed on May 18, 2021, the disclosure of which is incorporated by reference herein in its entirety as part of the present application.

TECHNICAL FIELD

The present disclosure belongs to the unsupervised domain adaptation field, and more particularly, relates to an unsupervised domain adaptation method, device, system and storage medium of semantic segmentation based on uniform clustering.

BACKGROUND ART

In the past decades, semantic segmentation models based on convolutional neural networks depend on large-scale annotated dataset and have gained outstanding success, and have great potential in fields of automatic driving and robotics. However, these large-scale annotated datasets need technicians with professional knowledge to annotate by intensive human labor and for a long time, which consumes expensive labor cost and time cost.

In order to solve the problem, the current research work gradually attempts synthetic datasets, e.g., GTA5, SYNTHIA and Synscapes. Synthetic datasets can be automatically generated by a game engine or a simulator, thus reducing labor costs. However, due to domain discrepancy, these models trained on the synthetic datasets cannot be well applied into real scenes. Therefore, the unsupervised domain adaptation technology has been proposed, which intends to transfer the knowledge from the source domain with labels to the target domain without labels.

In unsupervised domain adaptation tasks, most works on unsupervised domain adaptation aim at minimizing the gap between the source domain and target domain for domain-invariant features while utilizing the clustering structures or reweighting schemes for task-discriminative features. On the one hand, reducing the domain difference can generalize the model to the target domain; on the other hand, learning discriminative features enhances the classification accuracy. However, a number of experiments indicate that the learned semantic features are margin-unaware in terms of classes, which makes it difficult to distinguish small and dense objects. For example, some important traffic lights are usually classified as background buildings by the classification model, which will cause serious safety incidents, and thus it is intolerable in real application scenarios. Therefore, it is necessary to solve the problem that there exist margin-unaware classification boundaries in the unsupervised domain adaptation task.

Currently, the mainstream unsupervised domain adaptation technology uses the adversarial training as the core, and aligns the source domain and the target domain by a domain discriminator. However, these adversarial training methods ignore the pixel-level class structures. The recent works, e.g., SSF-DAN, MaxSquare, slightly improve the class structure of the semantic features by using the class-level discriminator and reweighting strategy. However, these indirect strategies still do not overcome the problem that the class structure is not clear. On the other hand, though most unsupervised domain adaptation methods based on clustering adjust the class structure, they are mainly applied into the image-level classification task, and do not consider the high-dimensional semantic feature space, thus resulting in a limited ability of identifying semantic information.

Thus, it is a technical problem to be solved urgently to explore an unsupervised domain adaptation method applied into semantic segmentation task and with clear category structure, so as to enhance the ability of predicting semantic labels using semantic segmentation models.

SUMMARY

In view of the above, the objective of the present disclosure is to provide an unsupervised domain adaptation method of semantic segmentation based on uniform clustering, and enhances the accuracy of semantic segmentation by overcoming the technical limitation that the class boundaries in the unsupervised adaptation task are not clear.

In order to realize the above objective, the present disclosure provides the following solutions:

In the first aspect, the embodiment provides an unsupervised domain adaptation method of semantic segmentation based on uniform clustering, comprising the following steps:

establishing a source domain dataset with labels and a target domain dataset without labels; the source domain dataset comprising source domain images and semantic labels of the source domain images, the target domain dataset comprising target domain images;

establishing an unsupervised domain adaptation network model; the unsupervised domain adaptation network model comprising a semantic segmentation network model for performing semantic segmentation on the source domain images and the target domain images and a discriminator model for adversarial training;

establishing an objective function of the unsupervised domain adaptation network model; the objective function of the unsupervised domain adaptation network model comprises the semantic segmentation loss for monitoring the performance of the semantic segmentation network model, the prototype-based source domain uniform clustering loss, the empirical prototype-based target domain uniform clustering loss, and the adversarial loss for monitoring the performance of the discriminator model;

obtaining a semantic segmentation network model of which parameters are optimized by using the source domain dataset and the target domain dataset, and using the objective function to optimize the network parameters of the unsupervised domain adaptation network model;

obtaining semantic labels of the target domain images by detecting the target domain images to be detected by using the semantic segmentation model of which the parameters are optimized.

In the second aspect, the embodiment provides an unsupervised domain adaptation device of semantic segmentation based on uniform clustering, comprising:

a dataset construction module for establishing a source domain dataset with labels and a target domain dataset without labels; the source domain dataset comprises source domain images, the corresponding semantic labels of the source domain images, and the target domain dataset comprises target domain images;

a model construction module for establishing an unsupervised domain adaptation network model; the unsupervised domain adaptation network model comprises a semantic segmentation network model for performing semantic segmentation on the source domain image and the target domain image and a discriminator model for adversarial training;

an objective function construction module for establishing an objective function of unsupervised domain adaptation network model; the objective function of the unsupervised domain adaptation network model comprises a semantic segmentation loss for monitoring the performance of a semantic segmentation network model, a prototype-based source domain uniform clustering loss, an empirical prototype-based target domain uniform clustering loss, and an adversarial loss for monitoring the performance of the discriminator model;

a parameter optimization module for obtaining a semantic segmentation model of which the parameters are optimized by using the source domain dataset and the target domain dataset, and using the objective function to optimize the network parameters of the unsupervised domain adaptation network model;

a detection module for obtaining semantic labels of the target domain images by using the semantic segmentation model of which the parameters are optimized to detect the target domain images to be detected.

In the third aspect, the embodiment provides an unsupervised domain adaptation system of semantic segmentation based on uniform clustering, comprising a storage, a processor, and computer programs stored in the storage and executable on the processor, wherein the processor implements the unsupervised domain adaptation method of semantic segmentation based on uniform clustering of the first aspect when executing the computer programs.

In the fourth aspect, the embodiment provides a computer readable storage medium on which computer programs are stored, wherein the computer programs implement the steps of the unsupervised domain adaptation method of the semantic segmentation based on uniform clustering when being processed and executed.

The above embodiments provide the unsupervised monitoring domain method, device, system, and storage medium of semantic segmentation based on uniform clustering; compared with the prior art, it has at least the following advantageous effects:

First, it establishes a prototype-based source domain uniform clustering loss and an empirical prototype-based target domain uniform clustering loss to reduce intra-class difference of pixels responding to the same category and to drive the pixels with the similar structures but different classes be away from each other, wherein they intend to be evenly distributed, increase the inter-class distance and overcome the problem of unclear class boundaries in the process of domain adaptation; next, the prototype-based source domain uniform clustering loss and the empirical prototype-based target domain uniform clustering loss are integrated into the adversarial training architecture to reduce the domain difference between the source domain and the target domain and enhance the adaptation of cross-domain data on the semantic segmentation model, which further enhances the accuracy of semantic segmentation.

BRIEF DESCRIPTION OF THE DRAWINGS

In order to describe the technical solutions of the present embodiments or the prior arts more clearly, the following will briefly describe the accompanying drawings used to describe the embodiments or the prior art; obviously, the following described accompanying drawings are merely some embodiments of the present disclosure; for those of ordinary skill in the art, other accompanying drawings can be obtained according to these accompanying drawings without any creative efforts.

DETAILED DESCRIPTION OF THE EMBODIMENTS

In order to make the objectives, technical solutions, and advantages of the present disclosure clearer, the following will further describe the present disclosure by combining the accompanying drawings and the embodiments. It should be understood that the detailed embodiments described herein are merely for interpreting the present disclosure, rather than restricting the protection scope of the present disclosure.

The current mainstream unsupervised domain adaptation methods mainly use adversarial training as the basic framework, and reduce the domain difference by aligning the source domain features and the target domain features. Though these methods enhance the generalization ability of the model, but ignore that the boundary structure of the features is ambiguous, and thus it causes technical defect that the class boundaries are not clear; in order to solve the problem that the semantic segmentation is not correct due to the technical defect that the class boundaries are not clear, the embodiments of the present disclosure provide an unsupervised domain adaptation method of semantic segmentation based on uniform clustering, and intend to maximize the inter-class distance by driving the feature structures of different classes towards the uniform distribution, and meanwhile minimize the intra-class difference, to form a clear-bounded category structure; in addition, the present disclosure further integrates the existing adversarial training loss, aligns the deep features with the clear category structure between the source domain and the target domain, and realizes knowledge transfer from the source domain to the target domain. The unsupervised domain adaptation method of semantic segmentation based on uniform clustering provided by the embodiments can be applied into domain adaptation task from virtual scenarios to real-world scenarios. For example, the model trained on the virtual dataset GTA5 can generalize to the real-world dataset Cityscapes, and can also be applied into automatic driving field and robotics field.

Figure 1:
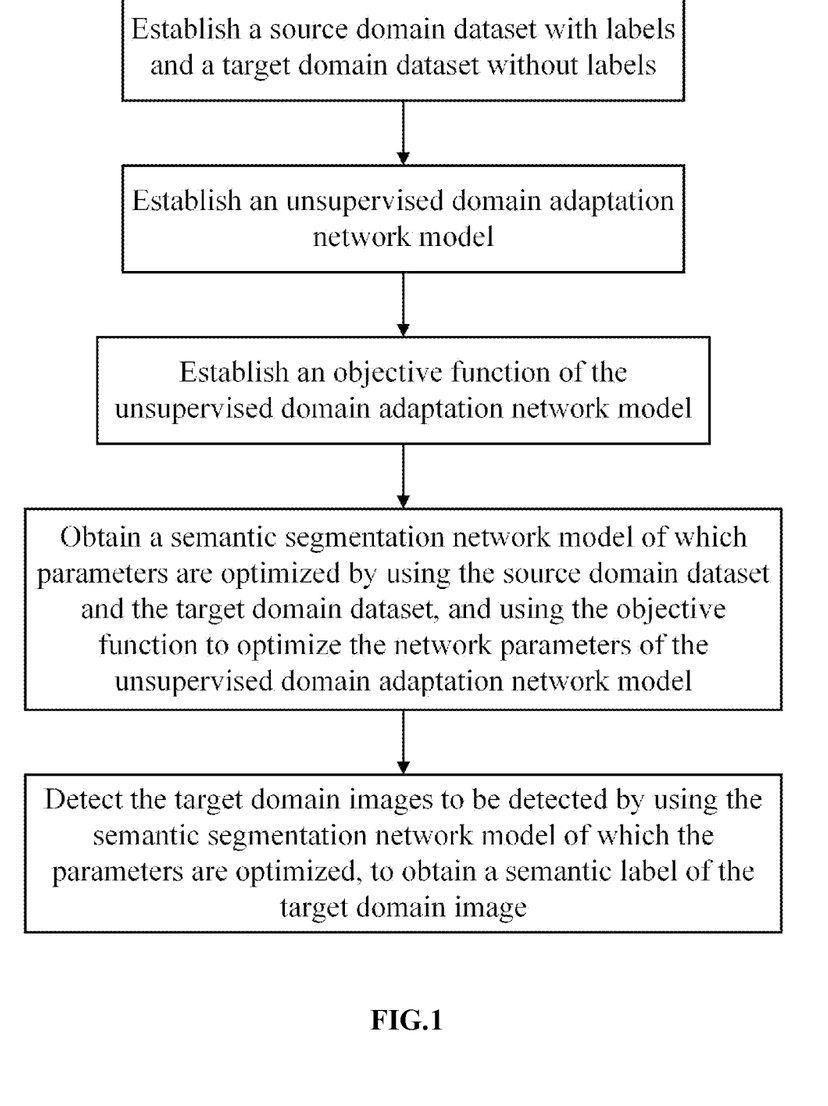
FIG. 1 is a flow chart of the unsupervised domain adaptation method of semantic segmentation based on uniform clustering in an embodiment.
Figure 2:
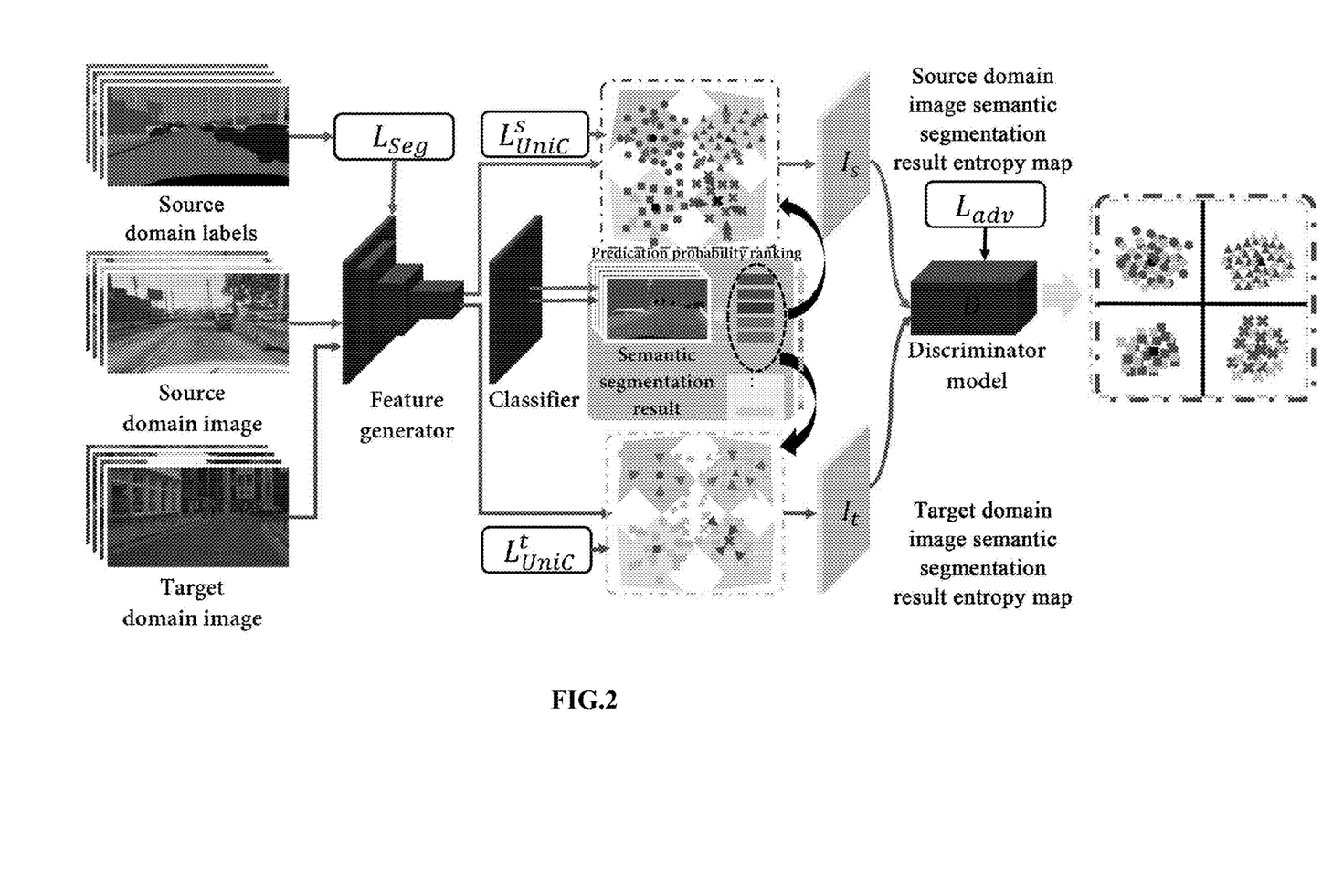
FIG. 2 is a schematic view of the unsupervised domain adaptation network model and training process in an embodiment.
Figure 3:
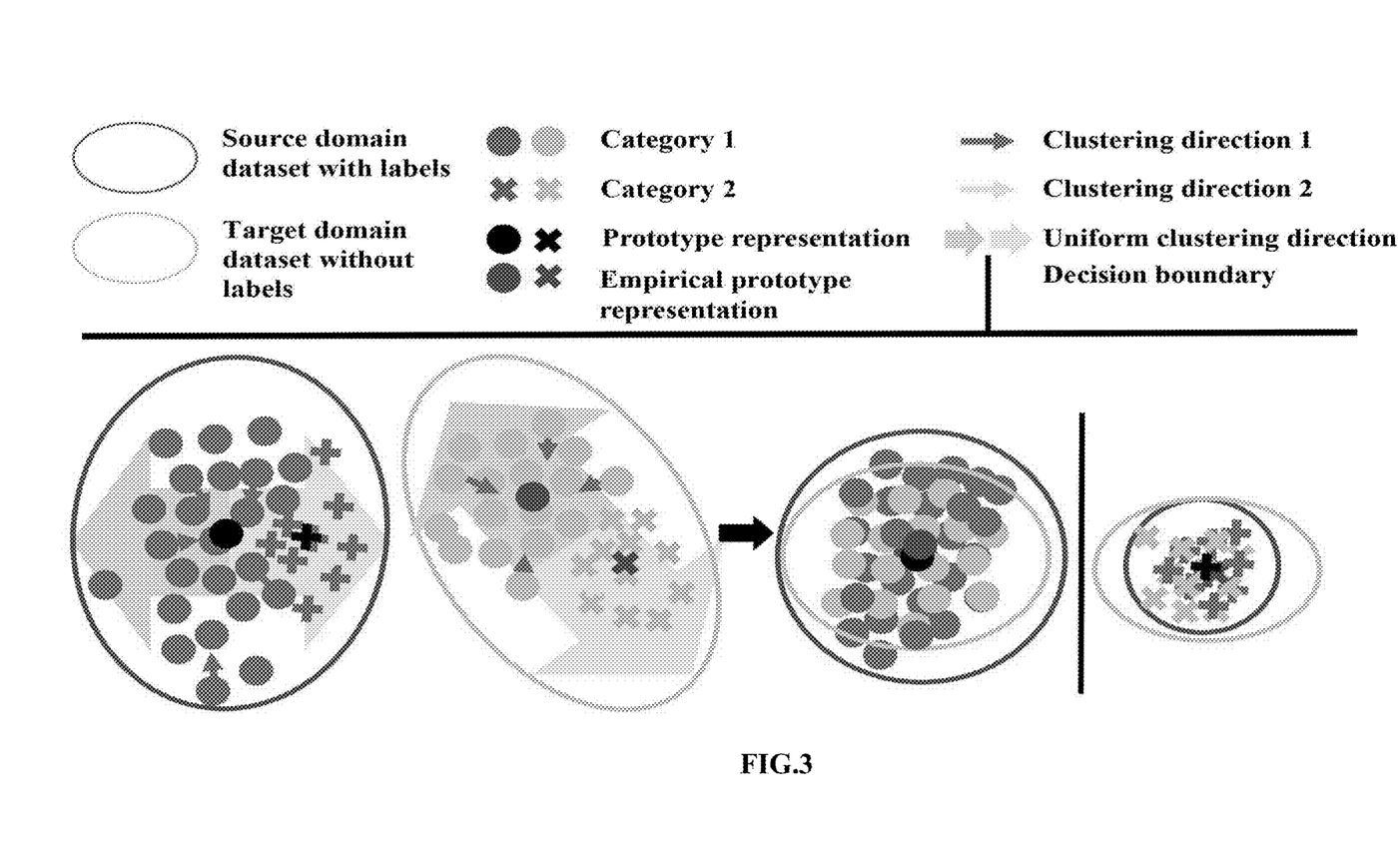
FIG. 3 is a principal schematic view of uniform clustering in the objective function of unsupervised domain adaptation network model.

FIG. 1 is a flow chart of the unsupervised domain adaptation method of semantic segmentation based on uniform clustering in an embodiment. FIG. 2 is a schematic view of the unsupervised domain adaptation network model and training process in an embodiment. FIG. 3 is a principal schematic view of uniform clustering in the objective function of unsupervised domain adaptation network model in an embodiment.

As shown in FIGS. 1-3, the unsupervised domain adaptation method of semantic segmentation based on uniform clustering provided by the embodiment comprises the following steps:

Step 1: establish a source domain dataset with labels and a target domain dataset without labels.

In the embodiment, the source domain dataset comprises source domain images, semantic labels of the source domain images, wherein the semantic labels refer to the labels of some classes that need to be segmented in the image. The target domain dataset does not have labels, and thus merely includes target domain images. The source domain image, the semantic label of the source domain image, and the target domain image form a source domain image set, a semantic label set of source domain image, a target domain image set, respectively, for the training of the unsupervised domain adaptation network model.

Step 2: establish an unsupervised domain adaptation network model.

In the embodiment, the established unsupervised domain adaptation network comprises a semantic segmentation network model and a discriminator model, wherein the generator and the discriminator model in the semantic segmentation network model are mutually optimized by way of adversarial training. The semantic segmentation network model is mainly used to perform semantic segmentation on the source domain image and the target domain image to get the semantic segmentation result, and the discriminator is used for adversarial training, i.e., determine whether the input semantic segmentation result comes from the target domain image or the source domain image.

In the embodiment, the semantic segmentation network model and the discriminator model use but are not limited to the following network structures, and the following will provide a usable semantic segmentation network model and a discriminator model example. The semantic segmentation network model is obtained by using RseNet as the basic framework and pretrained on ImageNet dataset, and includes a feature generator and a classifier; the discriminator model comprises a plurality of Blocks and a plurality of convolutional layers which are sequentially connected, wherein the Blocks comprise sequentially connected convolutional layers and activation layers.

Optionally, the semantic segmentation network model may take Deeplab-v2 with the ResNet-101 backbone pretrained on the ImageNet as the base model, including a feature generator and classifier.

The discriminator model is a neural network by sequentially stacking composite components and basic components, wherein the composite components are constructed by stacking the basic components sequentially, and the basic components include a convolutional layer with an input channel number of $\alpha$, an output channel number of $\beta$ a kernel size of 4×4, and a stride of 2; a LeakyReLU activation layer; the composite component is marked as Block ($\alpha$, $\beta$), and $\alpha$, $\beta$ are parameters of the composite components. Based on this, the discriminator model is constructed by sequentially stacking the following components: Bock (C, 64), Block (64, 128), Block (128, 256), Bock (256, 512), and a convolutional layer with an input channel number of 512, an output channel number of 1, a kernel size of 4×4, and a stride of 2, wherein C denotes a total number of the classification categories of the semantic segmentation network model.

Step 3: establish an objective function of the unsupervised domain network model.

In the embodiment, the objective function of the established unsupervised domain network model includes a semantic segmentation loss for monitoring the performance of the semantic segmentation network model, a prototype-based source domain uniform clustering loss, an empirical prototype-based target domain uniform clustering loss, and an adversarial loss for monitoring the performance of the discriminator model. Specifically, the weighted sum of the semantic segmentation loss, the prototype-based source domain uniform clustering loss, the empirical prototype-based target domain uniform clustering loss and the adversarial loss form the objective function of the unsupervised domain adaptation network model; preferably, the weights of the losses are all 1. The following will describe in detail each loss.

For the semantic segmentation loss, in an embodiment, the cross entropy loss of the source domain image with respect to the semantic segmentation network model is used as the semantic segmentation loss for monitoring the performance of the semantic segmentation network. Wherein, the semantic segmentation loss is denoted as $\mathcal{L}_{Seg}$, and the calculation process is:

$$\mathcal{L}_{Seg} = -\sum_{h,w}^{H,W} \sum_{c}^{C} y_s^{(h,w,c)} \log P_s^{(h,w,c)}$$

$$P_s^{(h,w,c)} = \varphi(f(x_s^{(h,w)}; \Theta); \vartheta)$$

Wherein $\mathcal{L}_{Seg}$ is a cross entropy loss of the semantic segmentation network model, $y_s^{(h,w,c)}$ denotes a semantic label whether the (h,w) position pixel $x_s^{(h,w)}$ in the source domain image $x_s$ belongs to class c, $P_s^{(h,w,c)}$ is a probability that the semantic segmentation network model predicts whether the (h,w) position pixel $x_s^{(h,w)}$ in the source domain image $x_s$ belongs to class c; $S=\{X_s, Y_s\}$ denotes a source domain dataset, $X_S$ is a source domain image set, $Y_S$ is a semantic label set of the source domain images; H, W denotes the image height and width respectively, and C denotes a total number of the classes of the semantic segmentation network model, wherein, $x_s=\{x_s^{(h,w)}|0 \leq h<H, 0 \leq w<W\}$, $x_s \in X_s$, $y_s=\{y_s^{(h,w,c)}|0 \leq h<H, 0 \leq w<W, 0 \leq c<C\}$, $y_s \in Y_s$. f denotes a feature generator of the semantic segmentation network, $\Theta$ is the parameter of f; $\varphi$ denotes a classifier of the semantic segmentation network model, $\vartheta$ is the parameter of $\varphi$, $f(x_s^{(h,w)}; \Theta)$ denotes features extracted by the feature generator f from the (h,w) position pixel $x_s^{(h,w)}$ of the source domain image $x_s$, and $\varphi(f(x_s^{(h,w)}; \Theta); \vartheta)$ denotes a prediction result made by the classifier according to features $f(x_s^{(h,w)}; \Theta)$.

For the source domain uniform clustering loss, in the embodiment, the prototype-based source domain uniform clustering loss is used for reducing the intra-class difference in the source domain and increasing the inter-class distance in the source domain, denoted as $\mathcal{L}_{UniC}^s$, and the calculation process is:

$$\mathcal{L}_{UniC}^s = \sum_{c}^{C} \sum_{h,w}^{H,W} \sigma(c \mid y_s^{(h,w)}) \|f(x_s^{(h,w)}; \Theta) - \mu_s^c\|_2^2 + \sum_{c}^{C} \rho_s^c \log \rho_s^c$$

For the target domain uniform clustering loss, in the embodiment, the empirical prototype-based target domain uniform clustering loss is used for reducing the intra-class difference and increasing the inter-class distance of the target domain, denoted as $\mathcal{L}_{UniC}^t$, and the calculation process is:

$$\mathcal{L}_{UniC}^t = \sum_c^C \sum_{h,w}^{H,W} \varphi(f(x_t^{(h,w)};\Theta);\vartheta)\|f(x_t^{(h,w)};\Theta) - \hat{\mu}_t^c\|_2^2 + \sum_c^C \hat{\rho}_t^c \log \hat{\rho}_t^c$$

Wherein, σ is an activation function, $\sigma(c|y_s^{(h,w)})$ denotes outputting 1 if the semantic label $y_s^{(h,w)}$ of the pixel $x_s^{(h,w)}$ belongs to class c, and outputting 0 if the semantic label $y_s^{(h,w)}$ of the pixel $x_s^{(h,w)}$ does not belong to class c; $\|f(x_s^{(h,w)};\Theta) - \mu_s^c\|_2^2$ denotes a square of L-2 norm between the features $f(x_s^{(h,w)};\Theta)$ extracted from the (h, w) position pixel $x_s^{(h,w)}$ in the source domain image $x_s$ and the prototype representation $\mu_s^c$ of class c, $\rho_s^c$ denotes empirical probability of pixels in the source domain image predicted as class c; $f(x_t^{(h,w)};\Theta)$ denotes the features extracted by the feature generator f from the (h, w) position pixel $x_t^{(h,w)}$ in the target domain image $x_t$, $\varphi(f(x_t^{(h,w)};\Theta);\vartheta)$ denotes the prediction result made by the classifier according to features $f(x_t^{(h,w)};\Theta)$, $\|f(x_t^{(h,w)};\Theta) - \hat{\mu}_t^c\|_2^2$ denotes a square of the L-2 norm between the features extracted from the (h,w) position pixel $x_t^{(h,w)}$ in the target domain image $x_t$ and the empirical prototype representation $\hat{\mu}_t^c$ of class c, $\hat{\rho}_t^c$ denotes the empirical probability of pixels predicted as class c in the target domain image.

In the embodiment, the prototype representation $\mu_s^c$ is calculated by according to features $f(x_t^{(h,w)};\Theta)$ of source domain image $x_s$, and the empirical prototype representation $\hat{\mu}_t^c$ is calculated by the features $f(x_t^{(h,w)};\Theta)$ of the target domain image $x_t$; the empirical probability $\rho_s^c$ is calculated by the prediction result $P_s^{(h,w,c)}$ of the class c on features $f(x_s^{(h,w)};\Theta)$ by the classifier φ; the empirical probability $\hat{\rho}_T^c$ is calculated by the prediction result $P_s^{(h,w,c)}$ of the class c on features $f(x_t^{(h,w)};\Theta)$ by the classifier φ. The detailed calculation process is:

$$\mu_s^c = \frac{1}{|S^c|} \sum_{h_s^{(h,w)} \in S^c} f(x_s^{(h,w)};\Theta)$$

$$\rho_s^c = \frac{1}{H \times W} \sum_{h,w}^{H,W} P_s^{(h,w,c)}$$

$$\hat{\mu}_t^c = \frac{1}{|T^c|} \sum \hat{P}_t^{(h,w,c)} f(x_t^{(h,w)};\Theta)$$

$$\hat{\rho}_t^c = \frac{1}{H \times W} \sum_{h,w}^{H,W} \hat{P}_t^{(h,w,c)}$$

$$\hat{P}_t^{(h,w,c)} = \varphi(f(x_t^{(h,w)};\Theta);\vartheta)$$

Wherein $S^c$ is a subset of the source domain dataset S, denoting a source domain pixel set belonging to class c; $|S^c|$ denotes a mode of $S^c$ set; $T=\{X_t\}$ denotes a target domain dataset, and $X_t$ is a target domain image set; $T^c$ is a subset of the target domain dataset, denoting a target domain pixel set predicted as class c; $|T^c|$ denotes a mode of $T^c$, and $x_t = \{x_t^{(h,w)} | 0 \leq h < H, 0 \leq w < W\}$, $x_t \in X_t$; $\hat{P}_t^{(h,w,c)}$ denotes a prediction result made by the classifier φ according to features $f(x_t^{(h,w)};\Theta)$.

For the adversarial loss, in the embodiment, the adversarial loss for monitoring the performance of the discriminator model is denoted as $\mathcal{L}_{adv}$, and the calculation process is:

$$\mathcal{L}_{adv} = -\sum_{h,w}^{H,W} \log(1 - D(I_s^{(h,w)})) + \log(D(I_t^{(h,w)}))$$

Wherein, $I_s^{(h,w)}$ is an entropy map of the (h,w) position pixel $x_s^{(h,w)}$ in the source domain image $x_s$, $I_t^{(h,w)}$ is an entropy map of the (h,w) position pixel $x_t^{(h,w)}$ in the target domain image $x_t$; D( ) denotes a domain probability that the discriminator model D determines that the input entropy map comes from the target domain; the closer the domain probability is to 1, the higher the probability that the input entropy map comes from the target domain is; the closer the domain probability is to 0, the higher the probability that the input entropy map comes from the source domain is.

In the embodiment, the entropy map $I_s^{(h,w)}$ and the entropy map $I_t^{(h,w)}$ are calculated by the following equations:

$$I_s^{(h,w)} = -\sum_c^C P_s^{(h,w,c)} \log P_s^{(h,w,c)}$$

$$I_t^{(h,w)} = -\sum_c^C \hat{P}_t^{(h,w,c)} \log \hat{P}_t^{(h,w,c)}$$

Based on the above semantic segmentation loss $\mathcal{L}_{Seg}$, the prototype-based source domain uniform clustering loss $\mathcal{L}_{UniC}^s$, the empirical prototype-based target domain uniform clustering loss $\mathcal{L}_{UniC}^t$ and the adversarial loss $\mathcal{L}_{adv}$, the established objective function $\mathcal{L}(X_s, Y_s, X_t)$ may be:

$$\mathcal{L}(X_s, Y_s, X_t) = \mathcal{L}_{Seg} + \mathcal{L}_{UniC}^s + \mathcal{L}_{UniC}^t + \mathcal{L}_{adv}$$

Combining with the training samples, the parameters of the unsupervised domain adaptation network model are optimized by the objective function $\mathcal{L}(X_s, Y_s, X_t)$.

Step 4, by using the source domain dataset and the target domain dataset, and optimizing the network parameters of the unsupervised domain adaptation network model by using the objective function, the semantic segmentation network model of which the parameters are optimized are obtained.

In the embodiment, when the parameters are optimized for the unsupervised domain adaptation network model, the network parameters of the discriminator model are fixed to respectively calculate parameter gradients of the semantic segmentation network model corresponding to the semantic segmentation loss, the parameter gradients of the semantic segmentation network model corresponding to the prototype-based source domain uniform clustering loss, and the parameter gradients of the semantic segmentation network model corresponding to the empirical prototype-based target domain uniform clustering loss; calculate the parameter gradients of the semantic segmentation network model and the discriminator model by the adversarial loss $\mathcal{L}_{adv}$; updating the network parameters of the semantic segmentation network model and the parameter gradients of the discriminator model according to the parameter gradients. The specific process comprises:

An initialization phase of the training: acquire a predefined number of training data samples from the source domain image set, the semantic label set of the source domain image, and the target domain image set, to form a training data sample set; establish a semantic segmentation network model and import the pre-trained parameters based on the ImageNet dataset, establish a discriminator model and initialize the discriminator model parameters randomly;

establish the stochastic gradient descent (SGD) optimizer and adaptive moment estimation (Adam) optimizer; set the number of model iterative training as N and the optimal objective function value as $\mathcal{L}_{best}$, e.g., N may be set as 120,000, and $\mathcal{L}_{best}$ may be 100, and save the current semantic segmentation network model as the optimal semantic segmentation network model, and save the current discrimination model as the optimal discriminator model; input the $i^{th}$ training data sample in the training data sample set into the unsupervised domain adaptation network model; the $i^{th}$ training data sample comprises a source domain image, a semantic label of the source domain image, and a target domain image; set a domain label, and the source domain label is set as 0, the target domain label is set as 1; the parameter gradients of the initialized semantic segmentation model are 0, and the parameter gradients of the initialized discriminator model are 0.

At the training phase, firstly, parameters of the discriminator model are fixed. Then it comprises the following steps: predicting the semantic segmentation result of the source domain image in the $i^{th}$ training data sample by using the semantic segmentation network model; and according to equitation, $\mathcal{L}_{Seg} = -\Sigma_{h,w}^{H,W} \Sigma_c^C y_s^{(h,w,c)} \log P_s^{(h,w,c)}$, calculating the semantic segmentation loss $\mathcal{L}_{Seg}$ by using the semantic label of the source domain image and the semantic segmentation result of the source domain image; and inversely propagating the semantic segmentation loss value to calculate the parameter gradients of the semantic segmentation network model.

In the embodiment, the semantic segmentation result of the source domain image with high confidence is obtained by filtering the semantic segmentation result of the source domain image, and the prototype-based source domain uniform clustering loss is calculated according to the semantic segmentation result of the source domain image with high confidence. The specific process is:

maintaining the pixels with the top b % prediction probability of each category in the semantic segmentation result of the source domain image, and setting the probability of each category of the semantic segmentation result in the source domain image that is not in the top b % of the pixel probability to 0 to obtain semantic segmentation result of source domain image with high confidence. In the embodiment, b % may be set as 30%; according to the equation, $\mathcal{L}_{UniC}^s = \Sigma_c^C \Sigma_{h,w}^{H,W} \sigma(c|y_s^{(h,w)}) \|f(x_s^{(h,w)};\Theta) - \mu_s^c\|_2^2 + \Sigma_c^C \hat{\rho}_s^c \log \hat{\rho}_s^c$, calculate the prototype-based source domain uniform clustering loss $\mathcal{L}_{UniC}^s$ by using the source domain image, the semantic label of the source domain image and the semantic segmentation result of the source domain image with high confidence, and reversely propagate the prototype-based source domain uniform clustering loss to calculate the parameter gradients of the semantic segmentation network model.

In the embodiment, the semantic segmentation network model is used to predict the semantic segmentation result of the target domain image in the $i^{th}$ training data sample. The high-confidence semantic segmentation results of the target domain images are selected from the semantic segmentation results of the target domain images, and the empirical prototype-based target domain uniform clustering loss is calculated according to the high confidence semantic segmentation results of the target domain images. The specific process may be:

maintaining the pixels with the top b % prediction probability of each category in the semantic segmentation result of the target domain image, and setting the probability of the pixels with the prediction probability of each category that are not in the top b % of the semantic segmentation result of the target domain image to 0 to obtain the semantic segmentation result of the target domain image with high confidence; according to the equation, $\mathcal{L}_{UniC}^t = \Sigma_c^C \Sigma_{h,w}^{H,W} \varphi(f(x_t^{(h,w)};\Theta);\vartheta) \|f(x_t^{(h,w)};\Theta) - \hat{\mu}_t^c\|_2^2 + \Sigma_c^C \hat{\rho}_t^c \log \hat{\rho}_t^c$, an empirical prototype-based target domain uniform clustering loss $\mathcal{L}_{UniC}^t$ is calculated by using the target domain image and the semantic segmentation result of the target domain image with high confidence, and the empirical prototype-based target domain uniform clustering loss is reversely propagated to calculate the parameter gradients of the semantic segmentation network model.

In the embodiment, according to the equation, $I_s^{(h,w)} = -\Sigma_c^C P_s^{(h,w,c)} \log P_s^{(h,w,c)}$, the entropy map of the source domain image segmentation result is calculated by using the semantic segmentation result of the source domain image; according to the equation, $I_t^{(h,w)} = -\Sigma_c^C \hat{P}_t^{(h,w,c)} \log \hat{P}_t^{(h,w,c)}$, the entropy map of the target domain image semantic segmentation result is calculated by using the semantic segmentation result of the target domain image.

The entropy map of the target domain image semantic segmentation result is input to the discriminator model, to output a domain probability of the target domain image semantic segmentation result entropy map; the binary cross entropy loss between the domain probability of the target domain image semantic segmentation result entropy map and the source domain label is calculated; the binary cross entropy loss between the domain probability of the entropy map of the target domain image semantic segmentation result and the source domain label is reversely propagated to calculate the parameter gradients of the semantic segmentation network model.

Then, the parameters of the semantic segmentation network model are fixed, and the parameters of the discriminator model are set to an updatable state, including: inputting the entropy map of the source domain image semantic segmentation result to the discriminator model, outputting a domain probability of the entropy map of the source domain image semantic segmentation result, calculating the binary cross entropy loss between a source domain probability of the entropy map of the source domain image semantic segmentation result and the source domain label, and reversely propagating the binary cross entropy loss between the domain probability of the source domain image semantic segmentation result entropy map and the source domain label to calculate the parameter gradients of the discriminator model.

Input the target domain image semantic segmentation result entropy map to the discriminator model, output a domain probability of the target domain image semantic segmentation result entropy map, calculate the binary cross entropy loss between a domain probability of the target domain image semantic segmentation result entropy map and the target domain label; reversely propagate the binary cross entropy loss between the domain probability of the entropy map of the target domain image semantic segmentation result and the target domain label to calculate the parameter gradients of the discriminator model.

In the embodiment, based on the above parameter gradients, a stochastic gradient descent (SGD) optimizer is used to update the semantic segmentation network model parameters; an adaptive moment estimation (Adam) optimizer is used to update the discriminator model parameters.

During training, the objective function, $\mathcal{L}(X_s, Y_s, X_t)$, of the unsupervised domain adaptation network model is calculated according to the equation, $\mathcal{L}(X_s, Y_s, X_t) = \mathcal{L}_{Seg} + \mathcal{L}_{UniC}^s + \mathcal{L}_{UniC}^t + \mathcal{L}_{adv}$, to determine whether the value of objective function $\mathcal{L}(X_s, Y_s, X_t)$ of the unsupervised domain adaptation network model is smaller than the optimal objective function value $\mathcal{L}_{best}$, to get the first determination result; if the first determination result denotes yes, use the current semantic segmentation network parameters to update the optimal semantic segmentation network model, and use the current discriminator model parameters to update the optimal discriminator model, and use the objective function value of the unsupervised domain adaptation network model to update the optimal objective function value $\mathcal{L}_{best}$; if the first determination result denotes no, then continue determining the number of iterations.

During training, it further determines whether i is larger than the number of the model iteration training N, to get the second determination result; if the second determination result denotes no, the value of i is increased by 1, and use the polynomial decay strategy to update the learning rate of the Stochastic Gradient Descent (SGD) optimizer and the Adaptive Moment Estimation (Adam) optimizer, and return to the step "input the $i^{th}$ training data sample in the training data sample set into the unsupervised domain adaptation network model; the $i^{th}$ training data sample comprises a source domain image, a semantic label of the source domain image, and a target domain image"; if the second determination result indicates yes, output the optimal semantic segmentation network model and the optimal discriminator model.

Step 5, use the semantic segmentation network model with optimized parameters to detect the target domain image to be detected, and obtain the semantic label of the target domain image.

After the training, the semantic segmentation network model with optimized parameters can be used for semantic segmentation tasks. The selected target domain image to be predicted can be input into the semantic segmentation network model, and the semantic label of the target domain image can be obtained by calculation.

The above unsupervised domain adaptation method of semantic segmentation based on uniform clustering is proposed in the domain adaptation scenario of the semantic segmentation model, and the source domain dataset with labels and the target domain dataset without labels can be acquired. Then, the prototype-based source domain uniform clustering loss and the empirical prototype-based target domain uniform clustering loss are proposed, which reduces the intra-class difference of pixels responding to the same category, and meanwhile drives the pixels with similar structures but different categories far away from each other, so that they tend to be evenly distributed, increasing the inter-class distance and overcoming the problem of unclear category boundaries in the domain adaptation process; next, the prototype-based source domain uniform clustering loss and the empirical prototype-based target domain uniform clustering loss are integrated into the adversarial training framework to reduce the domain difference between the source domain and the target domain, and enhance the adaptability of the cross-domain data in the semantic segmentation model.

Figure 4:
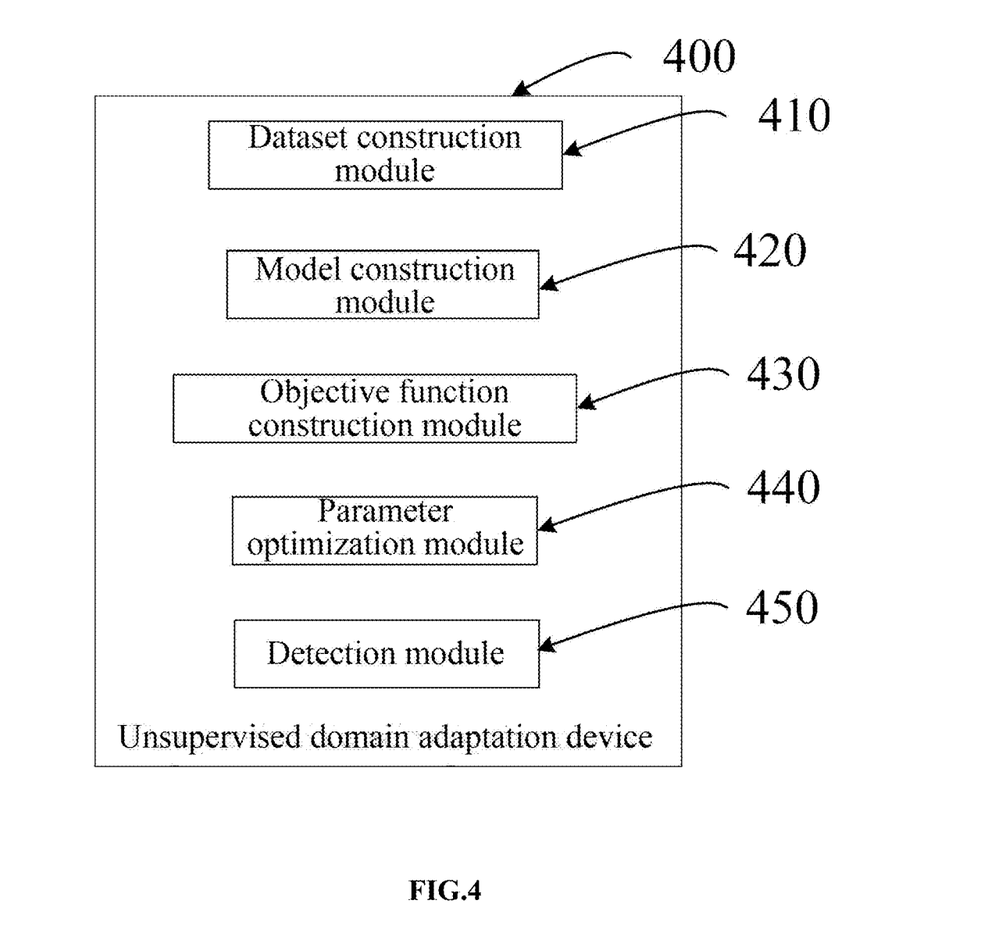
FIG. 4 is a flow chart of the unsupervised domain adaptation device of semantic segmentation based on uniform clustering.

The embodiment also provides an unsupervised domain adaptation device of semantic segmentation based on uniform clustering. As shown in FIG. 4, the unsupervised domain adaptation device 400 comprises:

A dataset construction module 410, which is used to establish a source domain dataset with labels and a target domain dataset without labels; the source domain dataset includes source domain images and semantic labels of the source domain images, and the target domain dataset includes target domain images;

A model construction module 420, which is used to establish an unsupervised domain adaptation network model; the unsupervised domain adaptation network model includes a semantic segmentation network model for performing semantic segmentation on the source domain images and the target domain images and a discriminator model for adversarial training;

An objective function construction module 430, which is used to establish an objective function of the unsupervised domain adaptation network model; the objective function of the unsupervised domain adaptation network model includes the semantic segmentation loss for monitoring the performance of the semantic segmentation network model, the prototype-based source domain uniform clustering loss, the empirical prototype-based target domain uniform clustering loss, and the adversarial loss for monitoring the performance of the discriminator model.

A parameter optimization module 440, which is used to use the source domain dataset, the target domain dataset and the objective function to optimize the network parameters of the unsupervised domain adaptation network model to obtain the semantic segmentation network model with optimized parameters;

A detection module 450, which is used to detect the target domain image to be detected by using the semantic segmentation network model with optimized parameters to obtain the semantic label of the target domain image.

It should be noted that the unsupervised domain adaptation device for semantic segmentation based on uniform clustering provided by the embodiment should be illustrated by using the division of the above functional modules when performing the semantic segmentation learning and application process, and the above function allocation can be finished by different functional modules as required, that is, the internal structure of the terminal or server is divided into different functional modules to complete all or part of the functions described above. In addition, the unsupervised domain adaptation device and the unsupervised domain adaptation method provided in the embodiment belong to the same concept. For the specific implementation process, please refer to the embodiment of the unsupervised domain adaptation method for semantic segmentation based on uniform clustering, which will not be repeated here.

The embodiment also provides an unsupervised domain adaptation system for semantic segmentation based on uniform clustering, including a memory, a processor, and computer programs stored in the memory and executable on the processor. The processor implements the above unsupervised domain adaptation method for semantic segmentation based on uniform clustering when executing the computer program, which specifically includes:

Step 1: establish a source domain dataset with labels and a target domain dataset without labels;

Step 2: establish an unsupervised domain adaptation network model;

Step 3: establish an objective function of the unsupervised domain adaptation network model;

Step 4: use the source domain dataset, the target domain dataset and the objective function to optimize the network parameters of the unsupervised domain adaptation network model, to obtain the semantic segmentation network model of which the parameters are optimized;

Step 5: detect the target domain image to be detected by using the semantic segmentation network model of which the parameters are optimized, to obtain semantic labels of the target domain image.

The embodiment also provides a computer-readable storage medium on which a computer program is stored, wherein when the computer program is processed and executed, the steps of the unsupervised domain adaptation method for semantic segmentation based on uniform clustering are realized.

Those of ordinary skill in the art can understand that all or part of the processes of the above embodiment methods can be implemented by instructing relevant hardware by a computer program. The computer program can be stored in a readable storage medium of a non-volatile computer, which, when being executed, may include the processes of the above-mentioned method embodiments. Wherein, any reference to memory, storage, database or other media used in the embodiments provided in the present disclosure may include non-volatile and/or volatile memory. Non-volatile memory may include read-only-memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SLDRAM), memory bus (Rambus) direct RAM (RDRAM), direct memory bus dynamic RAM (DRDRAM), and memory bus dynamic RAM (RDRAM), etc.

The above-described specific implementations explain the technical solutions and advantageous effects of the present disclosure in detail. It should be understood that the above are only the most preferred embodiments of the present disclosure and are not intended to limit the present disclosure. Any modifications, supplementations, and equivalent replacements made within the principle scope of the present disclosure shall be included in the protection scope of the present disclosure.

What is claimed is:

1. An unsupervised domain adaptation method of semantic segmentation based on uniform clustering, comprising:

establishing a source domain dataset with labels and a target domain dataset without labels; the source domain dataset comprising source domain images and semantic labels of the source domain images, the target domain dataset comprising target domain images;

establishing an unsupervised domain adaptation network model; the unsupervised domain adaptation network model comprising a semantic segmentation network model for performing semantic segmentation on the source domain images and the target domain images and a discriminator model for adversarial training;

establishing an objective function of the unsupervised domain adaptation network model; the objective function of the unsupervised domain adaptation network model comprises semantic segmentation loss for monitoring performance of the semantic segmentation network model, a prototype-based source domain uniform clustering loss, an empirical prototype-based target domain uniform clustering loss, and an adversarial loss for monitoring the performance of the discriminator model; wherein the adversarial loss for monitoring the performance of the discriminator model is denoted as $\mathcal{L}_{adv}$, and the calculation process is:

$$\mathcal{L}_{adv} = -\sum_{h,w}^{H,W} \log(1 - D(I_s^{(h,w)})) + \log(D(I_t^{(h,w)}))$$

wherein $I_s^{(h,w)}$ is an entropy map of (h,w) position pixel $x_s^{(h,w)}$ in the source domain image $x_s$, $I_t^{(h,w)}$ is an entropy map of (h,w) position pixel $x_t^{(h,w)}$ in the target domain image $x_t$, and D( ) denotes a domain probability that the discriminator model D determines that the input entropy map comes from the target domain;

the entropy map $I_s^{(h,w)}$, and entropy map $I_t^{(h,w)}$ are calculated by the following equations:

$$I_s^{(h,w)} = -\sum_c^C P_s^{(h,w,c)} \log P_s^{(h,w,c)}$$

$$I_t^{(h,w)} = -\sum_c^C \hat{P}_t^{(h,w,c)} \log \hat{P}_t^{(h,w,c)}$$

obtaining a semantic segmentation network model of which parameters are optimized by using the source domain dataset and the target domain dataset, and using the objective function to optimize network parameters of the unsupervised domain adaptation network model;

detecting the target domain images to be detected by using the semantic segmentation network model of which the parameters are optimized, to obtain a semantic label of the target domain image.

2. The unsupervised domain adaptation method of semantic segmentation based on uniform clustering according to claim 1, wherein the semantic segmentation network model uses ResNet as a basic framework and is obtained through image pre-training, comprising a feature generator and a classifier; the discriminator model comprises a plurality of sequentially connected Blocks and a plurality of convolutional layers, wherein the Blocks comprise sequentially connected convolutional layers and activation layers.

3. The unsupervised domain adaptation method of semantic segmentation based on uniform clustering according to claim 1, wherein the cross entropy loss of the source domain image with respect to the semantic segmentation network model is used as the semantic segmentation loss for monitoring the performance of the semantic segmentation network model.

4. The unsupervised domain adaptation method of semantic segmentation based on uniform clustering according to claim 1, wherein the prototype-based source domain uniform clustering loss is used for reducing intra-class difference and increasing inter-class distance in the source domain, denoted as $L_{UniC}^s$, and the calculation process is:

$$\mathcal{L}_{UniC}^s = \sum_c^C \sum_{h,w}^{H,W} \sigma(c \mid y_s^{(h,w)}) \| f(x_s^{(h,w)}; \Theta) - \mu_s^c \|_2^2 + \sum_c^C \rho_s^c \log \rho_s^c$$

the empirical prototype-based target domain uniform clustering loss is used for reducing intra-class difference and increasing inter-class distance in the target domain, denoted as $\mathcal{L}_{UniC}^t$, and the calculation process is:

$$\mathcal{L}_{UniC}^{t} = \sum_{c}^{C} \sum_{h,w}^{H,W} \varphi\left(f\left(x_t^{(h,w)}; \Theta\right); \vartheta\right) \left\|f\left(x_t^{(h,w)}; \Theta\right) - \hat{\mu}_t^c\right\|_2^2 + \sum_{c}^{C} \hat{\rho}_t^c \log \hat{\rho}_t^c$$

wherein, σ is an activation function, σ(c|$y_s^{(h,w)}$) denotes that if the semantic label $y_s^{(h,w)}$ of the pixel $x_s^{(h,w)}$ belongs to class c, then output 1, and if the semantic label $y_s^{(h,w)}$ of the pixel $x_s^{(h,w)}$ does not belong to class c, then output 0, $\|f(x_s^{(h,w)}; \Theta) - \mu_s^c\|_2^2$ denotes a square of L-2 norm between the features extracted from the (h, w) position pixel $x_s^{(h,w)}$ in the source domain image $x_s$ and the prototype representation $\mu_s^c$ of the class c, $\rho_s^c$ denotes an empirical probability of pixels predicted as class c in the source domain image, $f(x_s^{(h,w)}; \Theta)$ denotes that features extracted by the feature generator f from the (h,w) position pixel $x_t^{(h,w)}$ in the target domain image $x_t$, $\varphi(f(x_t^{(h,w)}; \Theta); \vartheta)$ denotes a prediction result made by the classifier according to features $f(x_t^{(h,w)}; \Theta)$, $\|f(x_s^{(h,w)}; \Theta) - \mu_s^c\|_2^2$ denotes a square of L-2 norm between the features extracted from the (h,w) position pixel $x_t^{(h,w)}$ in the target domain image $x_t$ and the empirical prototype representation $\hat{\mu}_t^c$ of class c, $\hat{\rho}_t^c$ denotes an empirical probability of the pixels predicted as class c in the target domain image, C denotes a total number of the classes of the semantic segmentation network model, Θ is the parameter of feature generator f; $\vartheta$ is the parameter of the classifier φ;

wherein the prototype representation $\mu_s^c$ is calculated by the features $f(x_s^{(h,w)}; \Theta)$ of the source domain image $x_s$, and the empirical prototype representation $\hat{\mu}_t^c$ is calculated by features $f(x_t^{(h,w)}; \Theta)$ of the target domain image $x_t$;

the empirical probability $\rho_s^c$ is calculated according to the prediction result $P_s^{(h,w,c)}$ of the features $f(x_s^{(h,w)}; \Theta)$ belonging to class c by the classifier φ;

the empirical probability $\hat{\rho}_t^c$ is calculated according to the prediction result $\hat{P}_t^{(h,w,c)}$ of the features $f(x_t^{(h,w)}; \Theta)$ belonging to class c by the classifier φ.

5. The unsupervised domain adaptation method of semantic segmentation based on uniform clustering according to claim 1, wherein the weighted sum of the semantic segmentation loss, the prototype-based source domain uniform clustering loss, the empirical prototype-based target domain uniform clustering loss and the adversarial loss form an objective function of the unsupervised domain adaptation network model; preferably, the weight of each loss is 1;

when parameters are optimized for the unsupervised domain adaptation network model, the network parameters of the discriminator model are fixed to calculate parameter gradients of the semantic segmentation network model corresponding to the semantic segmentation loss, parameter gradients of the semantic segmentation network model corresponding to the prototype-based source domain uniform clustering loss, and parameter gradients of the semantic segmentation network model corresponding to the empirical prototype-based target domain uniform clustering loss, respectively; calculate parameter gradients of the adversarial loss corresponding to the semantic segmentation network model and the discriminator model; update the network parameters of the semantic segmentation network model and the parameter gradients of the discriminator model according to the parameter gradients.

6. The unsupervised domain adaptation method of semantic segmentation based on uniform clustering according to claim 1, wherein selecting semantic segmentation results of the source domain image with predetermined confidence from semantic segmentation results of the source domain image, and calculating the prototype-based source domain uniform clustering loss according to semantic segmentation results of the source domain image with predetermined confidence;

selecting semantic segmentation results of the target domain image with predetermined confidence from semantic segmentation results of the target domain image, and calculating the empirical prototype-based target domain uniform clustering loss according to semantic segmentation results of the target domain image with predetermined confidence.

7. The unsupervised domain adaptation method of semantic segmentation based on uniform clustering according to claim 5, wherein selecting semantic segmentation results of the source domain image with predetermined confidence from semantic segmentation results of the source domain image, and calculating the prototype-based source domain uniform clustering loss according to semantic segmentation results of the source domain image with predetermined confidence;

selecting semantic segmentation results of the target domain image with predetermined confidence from semantic segmentation results of the target domain image, and calculating the empirical prototype-based target domain uniform clustering loss according to semantic segmentation results of the target domain image with predetermined confidence.

8. An unsupervised domain adaptation system of semantic segmentation based on uniform clustering, comprising a memory, a processor, and a computer program stored in the memory and executable on the processor, wherein the processor implements the unsupervised domain adaptation method of semantic segmentation based on uniform clustering according to claim 1, while executing the computer program.

9. The unsupervised domain adaptation system according to claim wherein the semantic segmentation network model uses ResNet as a basic framework and is obtained through image pre-training, comprising a feature generator and a classifier; the discriminator model comprises a plurality of sequentially connected Blocks and a plurality of convolutional layers, wherein the Blocks comprise sequentially connected convolutional layers and activation layers.

10. The unsupervised domain adaptation system according to claim 8, wherein the cross entropy loss of the source domain image with respect to the semantic segmentation network model is used as the semantic segmentation loss for monitoring the performance of the semantic segmentation network model.

11. The unsupervised domain adaptation system according to claim 8, wherein the prototype-based source domain uniform clustering loss is used for reducing intra-class difference and increasing inter-class distance in the source domain, denoted as $L_{UniC}^s$, and the calculation process is:

$$\mathcal{L}_{UniC}^{s} = \sum_{c}^{C} \sum_{h,w}^{H,W} \sigma\left(c \mid y_s^{(h,w)}\right) \left\|f\left(x_s^{(h,w)}; \Theta\right) - \mu_s^c\right\|_2^2 + \sum_{c}^{C} \rho_s^c \log \rho_s^c$$

the empirical prototype-based target domain uniform clustering loss is used for reducing intra-class difference and increasing inter-class distance in the target domain, denoted as $\mathcal{L}_{UniC}^{t}$, and the calculation process is:

$$\mathcal{L}_{UniC}^{t} = \sum_{c}^{C}\sum_{h,w}^{H,W} \varphi(f(x_t^{(h,w)};\Theta);\vartheta)\|f(x_t^{(h,w)};\Theta)-\hat{\mu}_t^c\|_2^2 + \sum_{c}^{C}\hat{\rho}_t^c \log\hat{\rho}_t^c$$

wherein, σ is an activation function, $\sigma(c|y_s^{(h,w)})$ denotes that if the semantic label $y_s^{(h,w)}$ of the pixel $x_s^{(h,w)}$ belongs to class c, then output 1, and if the semantic label $y_s^{(h,w)}$ of the pixel $x_s^{(h,w)}$ does not belong to class c, then output 0, $\|f(x_s^{(h,w)};\Theta)-\mu_s^c\|_2^2$ denotes a square of L-2 norm between the features extracted from the (h, w) position pixel $x_s^{(h,w)}$ in the source domain image $x_s$ and the prototype representation $\mu_s^c$ of the class c, $\rho_s^c$ denotes an empirical probability of pixels predicted as class c in the source domain image, $f(x_t^{(h,w)};\Theta)$ denotes that features extracted by the feature generator f from the (h,w) position pixel $x_t^{(h,w)}$ in the target domain image $x_t$, $\varphi(f(x_t^{(h,w)};\Theta);\vartheta)$ denotes a prediction result made by the classifier according to features $f(x_t^{(h,w)};\Theta)$, $\|f(x_s^{(h,w)};\Theta)-\mu_s^c\|_2^2$ denotes a square of L-2 norm between the features extracted from the (h,w) position pixel $x_t^{(h,w)}$ in the target domain image $x_t$ and the empirical prototype representation $\hat{\mu}_t^c$ of class c, $\hat{\rho}_t^c$ denotes an empirical probability of the pixels predicted as class c in the target domain image, C denotes a total number of the classes of the semantic segmentation network model, Θ is the parameter of feature generator f; ϑ is the parameter of the classifier φ;
wherein the prototype representation $\mu_s^c$ is calculated by the features $f(x_s^{(h,w)};\Theta)$ of the source domain image $x_s$, and the empirical prototype representation $\hat{\mu}_t^c$ is calculated by features $f(x_t^{(h,w)};\Theta)$ of the target domain image $x_t$;
the empirical probability $\rho_s^c$ is calculated according to the prediction result $P_s^{(h,w,c)}$ of the features $f(x_s^{(h,w)};\Theta)$ belonging to class c by the classifier φ;
the empirical probability $\hat{\rho}_t^c$ is calculated according to the prediction result $\hat{P}_t^{(h,w,c)}$ of the features $f(x_t^{(h,w)};\Theta)$ belonging to class c by the classifier φ.

12. The unsupervised domain adaptation system according to claim 8, wherein the weighted sum of the semantic segmentation loss, the prototype-based source domain uniform clustering loss, the empirical prototype-based target domain uniform clustering loss and the adversarial losses form an objective function of the unsupervised domain adaptation network model; preferably, the weight of each loss is 1;
when parameters are optimized for the unsupervised domain adaptation network model, the network parameters of the discriminator model are fixed to calculate parameter gradients of the semantic segmentation network model corresponding to the semantic segmentation loss, parameter gradients of the semantic segmentation network model corresponding to the prototype-based source domain uniform clustering loss, and parameter gradients of the semantic segmentation network model corresponding to the empirical prototype-based target domain uniform clustering loss, respectively; calculate parameter gradients of the adversarial loss corresponding to the semantic segmentation network model and the discriminator model; update the network parameters of the semantic segmentation network model and the parameter gradients of the discriminator model according to the parameter gradients.

13. The unsupervised domain adaptation system according to claim 8, wherein selecting semantic segmentation results of the source domain image with predetermined confidence from semantic segmentation results of the source domain image, and calculating the prototype-based source domain uniform clustering loss according to semantic segmentation results of the source domain image with predetermined confidence;
selecting semantic segmentation results of the target domain image with predetermined confidence from semantic segmentation results of the target domain image, and calculating the empirical prototype-based target domain uniform clustering loss according to semantic segmentation results of the target domain image with predetermined confidence.

14. The unsupervised domain adaptation system according to claim 12, wherein selecting semantic segmentation results of the source domain image with predetermined confidence from semantic segmentation results of the source domain image, and calculating the prototype-based source domain uniform clustering loss according to semantic segmentation results of the source domain image with predetermined confidence;
selecting semantic segmentation results of the target domain image with predetermined confidence from semantic segmentation results of the target domain image, and calculating the empirical prototype-based target domain uniform clustering loss according to semantic segmentation results of the target domain image with predetermined confidence.

15. An unsupervised domain adaptation method of semantic segmentation based on uniform clustering, comprising following steps:
establishing a source domain dataset with labels and a target domain dataset without labels; the source domain dataset comprising source domain images and semantic labels of the source domain images, the target domain dataset comprising target domain images;
establishing an unsupervised domain adaptation network model; the unsupervised domain adaptation network model comprising a semantic segmentation network model for performing semantic segmentation on the source domain images and the target domain images and a discriminator model for adversarial training;
establishing an objective function of the unsupervised domain adaptation network model; the objective function of the unsupervised domain adaptation network model comprises semantic segmentation loss for monitoring performance of the semantic segmentation network model, a prototype-based source domain uniform clustering loss, an empirical prototype-based target domain uniform clustering loss, and an adversarial loss for monitoring the performance of the discriminator model;
obtaining a semantic segmentation network model of which parameters are optimized by using the source domain dataset and the target domain dataset, and using the objective function to optimize network parameters of the unsupervised domain adaptation network model;
detecting the target domain images to be detected by using the semantic segmentation network model of which the parameters are optimized, to obtain a semantic label of the target domain image,
wherein the prototype-based source domain uniform clustering loss is used for reducing intra-class difference and increasing inter-class distance in the source domain, denoted as $L_{UniC}^{s}$, and the calculation process is:

$$\mathcal{L}_{UniC}^{s} = \sum_{c}^{C} \sum_{h,w}^{H,W} \sigma\left(c \mid y_{s}^{(h,w)}\right) \left\| f\left(x_{s}^{(h,w)}; \Theta\right) - \mu_{s}^{c} \right\|_{2}^{2} + \sum_{c}^{C} \rho_{s}^{c} \log \rho_{s}^{c}$$

the empirical prototype-based target domain uniform clustering loss is used for reducing intra-class difference and increasing inter-class distance in the target domain, denoted as $\mathcal{L}_{UniC}^{t}$, and the calculation process is:

$$\mathcal{L}_{UniC}^{t} = \sum_{c}^{C} \sum_{h,w}^{H,W} \varphi\left(f\left(x_{t}^{(h,w)}; \Theta\right); \vartheta\right) \left\| f\left(x_{t}^{(h,w)}; \Theta\right) - \hat{\mu}_{t}^{c} \right\|_{2}^{2} + \sum_{c}^{C} \hat{\rho}_{t}^{c} \log \hat{\rho}_{t}^{c}$$

wherein, $\sigma$ is an activation function, $\sigma(c | y_s^{(h,w)})$ denotes that if the semantic label $y_s^{(h,w)}$ of the pixel $x_s^{(h,w)}$ belongs to class c, then output 1, and if the semantic label $y_s^{(h,w)}$ of the pixel $x_s^{(h,w)}$ does not belong to class c, then output 0, $\|f(x_s^{(h,w)}; \Theta) - \mu_s^c\|_2^2$ denotes a square of L-2 norm between the features extracted from the (h, w) position pixel $x_s^{(h,w)}$ in the source domain image $x_s$ and the prototype representation $\mu_s^c$ of the class c, $\rho_s^c$ denotes an empirical probability of pixels predicted as class c in the source domain image, $f(x_t^{(h,w)}; \Theta)$ denotes that features extracted by the feature generator f from the (h,w) position pixel $x_t^{(h,w)}$ in the target domain image $x_t$, $\varphi(f(x_t^{(h,w)}; \Theta); \vartheta)$ denotes a prediction result made by the classifier according to features $f(x_t^{(h,w)}; \Theta)$, $\|f(x_s^{(h,w)}; \Theta) - \mu_s^c\|_2^2$ denotes a square of L-2 norm between the features extracted from the (h,w) position pixel $x_t^{(h,w)}$ in the target domain image $x_t$ and the empirical prototype representation $\hat{\mu}_t^c$ of class c, $\hat{\rho}_t^c$ denotes an empirical probability of the pixels predicted as class c in the target domain image, C denotes a total number of the classes of the semantic segmentation network model, $\Theta$ is the parameter of feature generator f; $\vartheta$ is the parameter of the classifier $\varphi$;

wherein the prototype representation $\mu_s^c$ is calculated by the features $f(x_s^{(h,w)}; \Theta)$ of the source domain image $x_s$, and the empirical prototype representation $\mu_t^c$ is calculated by features $f(x_t^{(h,w)}; \Theta)$ of the target domain image $x_t$;

the empirical probability $\rho_s^c$ is calculated according to the prediction result $P_s^{(h,w,c)}$ of the features $f(x_s^{(h,w)}; \Theta)$ belonging to class c by the classifier $\varphi$;

the empirical probability $\hat{\rho}_t^c$ is calculated according to the prediction result $\hat{P}_t^{(h,w,c)}$ of the features $f(x_t^{(h,w)}; \Theta)$ belonging to class c by the classifier $\varphi$.

16. An unsupervised domain adaptation system of semantic segmentation based on uniform clustering, comprising a memory, a processor, and a computer program stored in the memory and executable on the processor, wherein the processor implements the unsupervised domain adaptation method of semantic segmentation based on uniform clustering according to claim 15, while executing the computer program.

* * * * *